(12) United States Patent
Sterns

(10) Patent No.: US 7,337,899 B2
(45) Date of Patent: Mar. 4, 2008

(54) PILLBOX

(75) Inventor: Anthony A. Sterns, Akron, OH (US)

(73) Assignee: Creative Action LLC, Akron, OH (US)

( * ) Notice: Subject to any disclaimer, the term of this patent is extended or adjusted under 35 U.S.C. 154(b) by 312 days.

(21) Appl. No.: 10/807,683

(22) Filed: Mar. 24, 2004

(65) Prior Publication Data

US 2004/0188290 A1 Sep. 30, 2004

Related U.S. Application Data

(60) Provisional application No. 60/457,484, filed on Mar. 25, 2003.

(51) Int. Cl.
 B65D 85/00 (2006.01)
 B65D 85/42 (2006.01)

(52) U.S. Cl. ............... 206/320; 206/534; 206/540; 206/38

(58) Field of Classification Search .......... 206/37, 206/38, 320, 305, 528; 224/247, 253; D3/203.2
See application file for complete search history.

(56) References Cited

U.S. PATENT DOCUMENTS

| | | | |
|---|---|---|---|
| 1,851,750 A * | 3/1932 | Cartuschka | 206/101 |
| 2,586,740 A * | 2/1952 | Swanson | 224/667 |
| 2,854,132 A * | 9/1958 | Bjerknes et al. | 70/456 R |
| 3,027,995 A * | 4/1962 | Littman | 206/0.81 |
| 3,179,891 A * | 4/1965 | Sharma | 455/231 |
| 4,084,695 A | 4/1978 | Halbich | |
| 4,133,445 A | 1/1979 | Mandelbaum | |
| 4,253,572 A | 3/1981 | Halbich | |
| 4,345,541 A | 8/1982 | Villa-Real | |
| 4,372,445 A | 2/1983 | Keffeler | |
| 4,572,376 A | 2/1986 | Wrennall | |
| 4,640,560 A | 2/1987 | Blum | |
| 4,785,932 A | 11/1988 | Checke | |
| 4,793,492 A | 12/1988 | Halbich | |
| 5,105,949 A | 4/1992 | Blair | |
| 5,740,938 A | 4/1998 | Hofmann et al. | |
| 5,806,670 A | 9/1998 | Harlan et al. | |
| 5,921,394 A | 7/1999 | Shroff | |
| 5,933,772 A * | 8/1999 | Wolff | 455/351 |
| 6,032,085 A | 2/2000 | Laurent et al. | |
| 6,048,087 A | 4/2000 | Laurent et al. | |
| 6,082,544 A | 7/2000 | Romick | |
| 6,107,911 A | 8/2000 | Perrone | |
| 6,281,798 B1 | 8/2001 | Laurent et al. | |
| 6,338,535 B1 | 1/2002 | Rickert | |
| 6,382,416 B1 | 5/2002 | Gainey | |

(Continued)

Primary Examiner—Jila M Mohandesi
(74) Attorney, Agent, or Firm—Wayne D. Porter, Jr.

(57) ABSTRACT

A pillbox that can be used with a portable electronic device ("PED") such as a cellular telephone or personal digital assistant includes a generally cubic body portion that is attached to one end of a PED. The body portion defines a compartment within which medication can be placed. Preferably, an extension projects from one wall of the body portion and the extension is connected to the PED. The body portion preferably conforms generally to the contour of the PED. A door is connected to the body portion to permit selective access to the compartment. Other embodiments of the invention include a holster within which the PED can be inserted. In some of the embodiments, the door defines the medication-storage compartment.

11 Claims, 4 Drawing Sheets

U.S. PATENT DOCUMENTS 6,464,506 B1    10/2002  Welles
6,662,081 B1 *  12/2003  Jacober et al. .............. 700/242
2003/0000865 A1 *  1/2003  Carlino ...................... 206/581
2004/0113417 A1 *  6/2004  Chareas et al. ............... 281/44

* cited by examiner

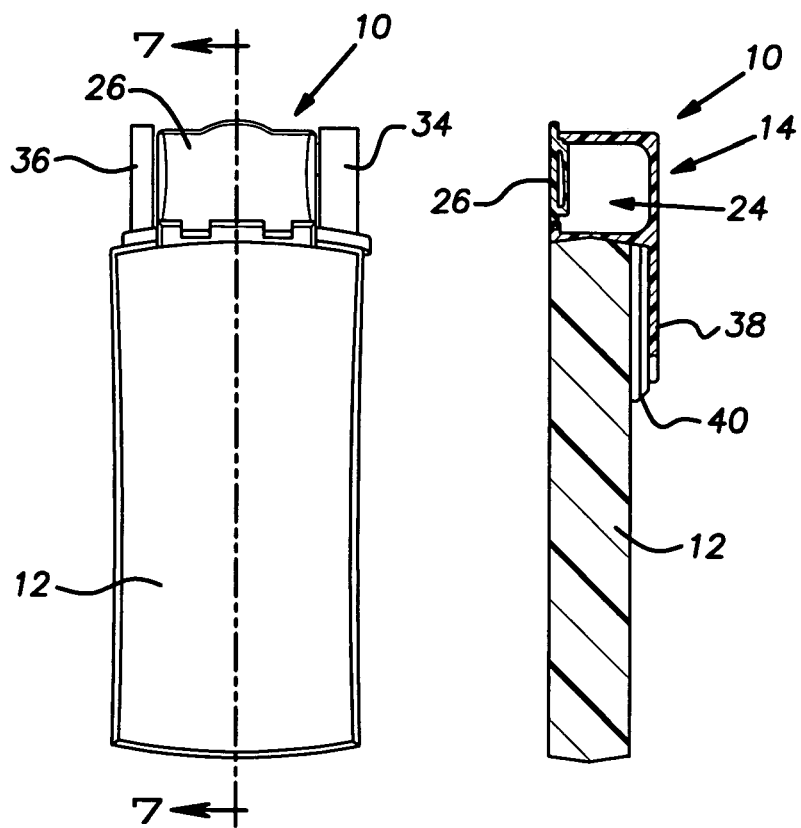
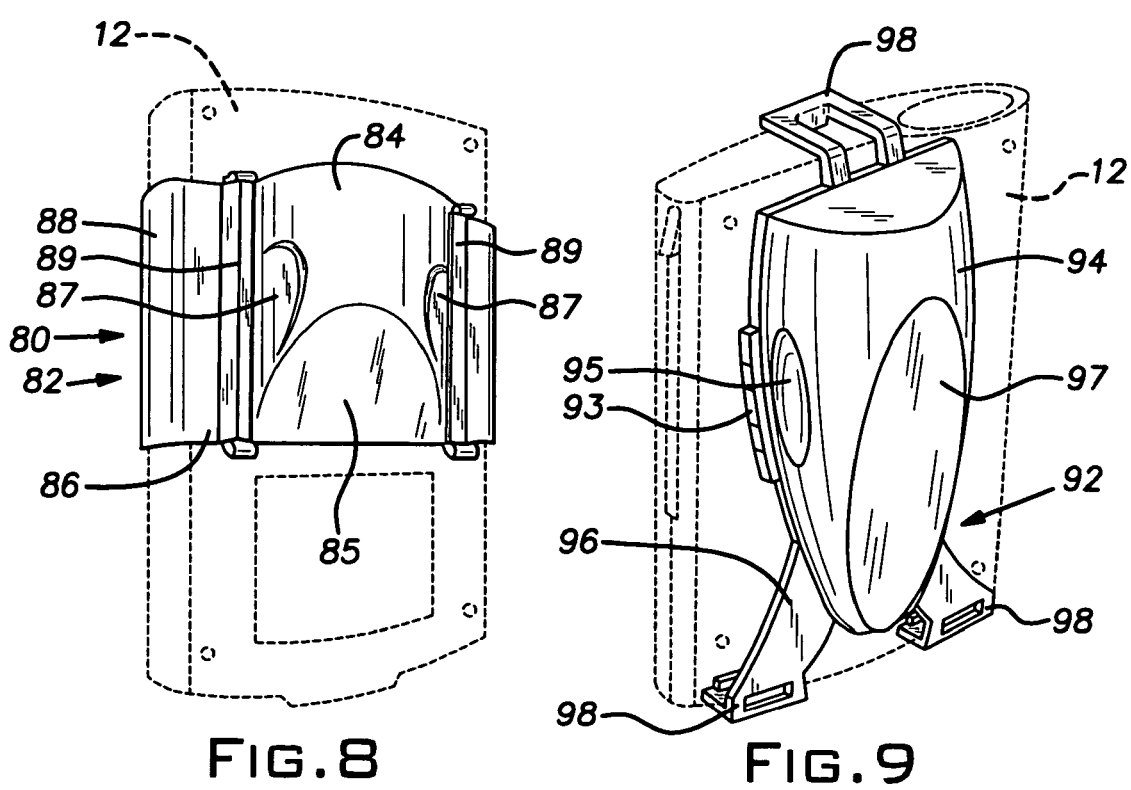

PILLBOX

REFERENCE TO RELATED APPLICATION

The present application claims priority from, and incorporates by reference, U.S. Provisional Application Ser. No. 60/457,484, filed Mar. 25, 2003.

GOVERNMENT INTEREST IN THE INVENTION

The present invention was developed partially with government support under a Small Business Innovation Research Program Grant. The government has certain rights in the invention.

BACKGROUND OF THE INVENTION

1. Field of the Invention

The invention relates to pillboxes and, more particularly, to a pillbox that can be attached to a portable electronic device such as a cellular telephone or personal digital assistant.

2. Description of the Prior Art

Pillboxes in a wide variety of sizes and shapes have been known for many years. See, for example, U.S. Pat. Nos. 4,372,445; 4,640,560; 5,740,938;and 6,082,544. Unfortunately, as shown by the referenced patents, pillboxes often are large, cumbersome objects that are difficult to transport conveniently.

Recently, portable electronic devices such as cellular telephones and personal digital assistants have become widely available. For convenience, any such device will be referred to herein as a "PED." PED's purposefully are compact and portable, and usually are carried by their owners at all times. However, PED's are used only for such purposes as aural communication, mathematical calculations, and so forth. While the device shown in U.S. Pat. No. 6,107,911 discloses a self-contained programmable time interval alarm for medication administration, the device is large and unwieldy. More specifically, the device employs a housing that employs a clamp with two jaws to accommodate the neck of a medication container. Desirably, a pillbox would be available that could be attached to a PED and carried therewith. Any such pillbox hopefully would be compact, inexpensive, and readily usable.

SUMMARY OF THE INVENTION

In response to the foregoing concerns, the present invention provides a new and improved pillbox that can be attached to and carried with a PED. In one embodiment, the invention comprises a generally cubic body portion that is attached to one end of a PED. The body portion defines a compartment within which medication such as pills can be disposed. It is expected that the compartment will have rounded inside corners that will make removing pills easy and which will prevent pills from getting stuck in the corners. Preferably, an extension projects from one wall of the body portion and the extension is connected to the PED. The body portion preferably conforms generally to the shape of the PED. A door is connected to the body portion to permit selective access to the compartment.

Other embodiments of the invention include a holster within which the PED can be inserted. Various forms of a medication-holding compartment are provided. For example, the body portion in some embodiments has a generally flat wall. A door defines a medication-holding compartment. The door interacts with the wall to selectively open and close the compartment. In all of the embodiments, it is expected that the pillbox according to the invention will be compact, readily usable, and capable of being manufactured quickly and inexpensively, preferably in a plastics molding operation.

The foregoing and other features and advantages of the invention will be apparent from the following description and claims, taken in conjunction with the accompanying drawings.

BRIEF DESCRIPTION OF THE DRAWINGS

FIG. 6 is a front elevation view of the assembled PED and pillbox of FIG. 1;

FIG. 7 is a cross-sectional view of the assembled PED and pillbox of FIG. 1 taken along a plane indicated by line 7-7 in FIG. 6;

FIG. 8 is a perspective view of another embodiment of a pillbox according to the invention that includes a sliding drawer;

FIG. 9 is a perspective view of another embodiment of a pillbox according to the invention that includes a hinged door that defines a medication compartment;

DESCRIPTION OF THE PREFERRED EMBODIMENT

Figure 1:
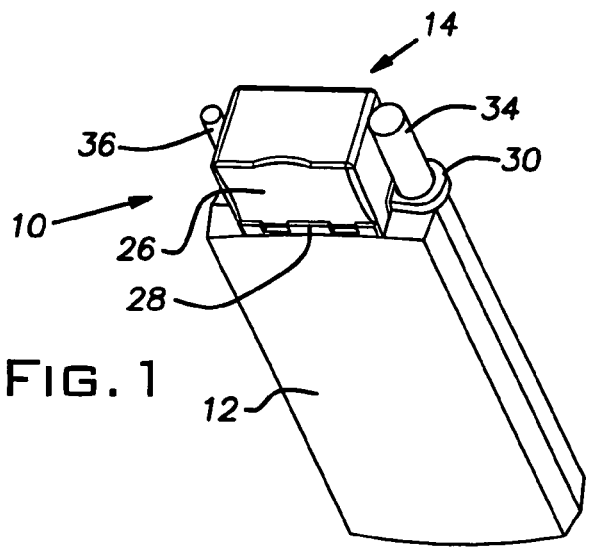
FIG. 1 is a perspective view of a pillbox according to the invention attached to a PED.
Figure 2:
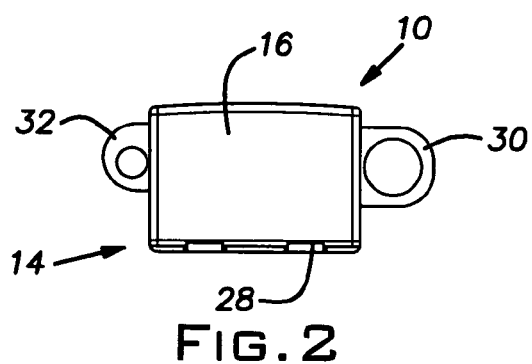
FIG. 2 is a top plan view of the pillbox of FIG. 1.
Figures 3, 4, 5:
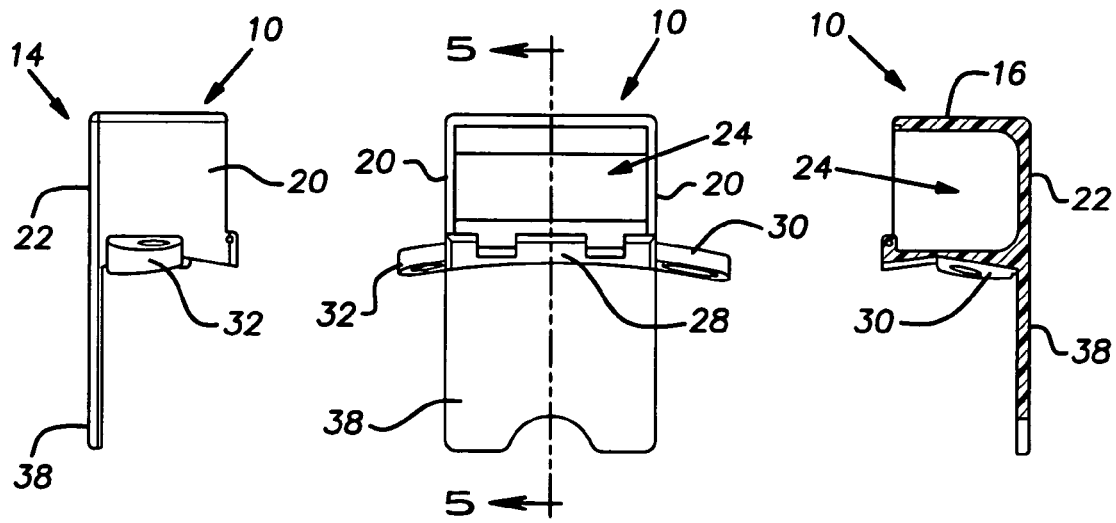
FIG. 3 is a side elevation view of the pillbox of FIG. 1.
FIG. 4 is a front elevation view of the pillbox of FIG. 1 showing a hinged door in the open position.
FIG. 5 is a cross-sectional view of the pillbox of FIG. 1 taken along a plane indicated by line 5-5 in FIG. 4.

Referring to FIGS. 1-7, a pillbox according to the invention is indicated by the reference numeral 10. The pillbox 10 can be used with a PED 12. Suitable PED's include Samsung Model SPH-i300, Samsung Model SPH-i500, Kyocera Model 7135, Palm One Tungsten E, Palm One Tungsten W and numerous others. It is possible that the pillbox 10 could be manufactured as part of the PED 12, although it is more likely that the pillbox 10 will be manufactured separately from the PED 12 and used as an aftermarket attachment.

The pillbox 10 includes a body portion 14 that fits on the top of the PED 12. The body portion 14 includes a top wall 16, a bottom wall 18, opposing side walls 20, and a rear wall 22. The interior surfaces of the walls 16, 18, 20, 22 define a cavity, or compartment 24 within which medication such as pills or capsules can be placed. As used herein, the terms "medication" or "pills" are intended to refer to tablets, capsules, pellets, or any other form of medicine or food (such as candy or breath mints) that can be ingested by a human being. The intersections of the walls 16, 18, 20, 22, are rounded, particularly at the corners, in order to prevent pills from becoming wedged or otherwise stuck in the compartment 24.

A door 26 is connected to the forward edge of the bottom wall 18 by a hinge indicated at 28. The door 26 completely covers the front of the compartment 24 when the door 26 is in the closed position as indicated in FIG. 1.

A connection between the body portion 14 and the PED 12 is provided. The connection includes a pair of loops 30, 32 that extend laterally from the bottom wall 18 near the intersection with the side walls 20. The loop 30 fits about an antenna 34 included as part of the PED 12, while the loop 32 fits about a stylus 36 included as part of the PED 12. A generally rectangular extension 38 projects from the bottom of the rear wall 22. The extension 38 is connected to the upper, rear portion of the PED 12 by means of hook and loop fasteners 40 (FIG. 7).

In the illustrated embodiment, the body portion 14 and the extension 40 are configured to closely match the shape of the portions of the PED 12 with which they are in contact. It is expected that the pillbox 10 will be manufactured from a plastics material such as ABS or a similar material in a molding operation. It is possible to manufacture the pillbox 10 from a more flexible material that could be molded to the shape of the PED 12 after it has been positioned in place on the PED 12. While a hook and loop attachment has been described, the extension 38 can be adapted to engage slots or protrusions on the rear of the PED 12, if provided. The extension 38 also could be attached by an adhesive layer. It also is possible for the pillbox 10 to be held in place and protected by a wrap-around sleeve, in a manner similar to commercially available PED's.

The embodiment of the invention illustrated in FIGS. 1-7 has a single-chambered compartment 24 with a single hinged door 26. It is possible to provide a multi-chambered compartment 24. For example, there could be four compartments 26 with indications for time of day (morning, noon, evening, night), or seven compartments 26 with indications for each day of the week. If a multi-chambered compartment 24 is provided, either a single door 26 can be used to close all of the chambers simultaneously, or a separate door 26 could be used for each chamber. The hinge 28 can be provided in any of several variations, such as integrated hinges or post hinges. The door 26 can be provided with molded impressions for labels or raised lettering for branding the product or for identifying a particular drug or drugs, manufacturers, or physicians.

The pillbox 10 is intended to provide storage for a daily set of pills and to work in conjunction with alarm software on the PED 12. Preferably, the pillbox 10 is provided with software that reminds the user when to take the medication. The software can be loaded into the PED 12. If a wireless internet connection is available, a physician, drug manufacturer, or medical supply company can provide the user with reminders and/or information about the medication that should be taken by the patient and a schedule for taking the medication.

The body portion 14 is shown as being of a generally cubic shape. The shape of the body portion 14 can be changed to other shapes, if desired, although it is expected that a cubic shape will be preferred for reasons of appearance and functionality.

ALTERNATIVE EMBODIMENTS

Referring now to FIGS. 8-15, several alternative embodiments of the invention are illustrated. The alternative embodiments of the invention share various characteristics, including the capability to be attached to a PED and the use of a movable door that either exposes a medication-storage compartment or which itself forms a medication-storage compartment.

Figure 10:
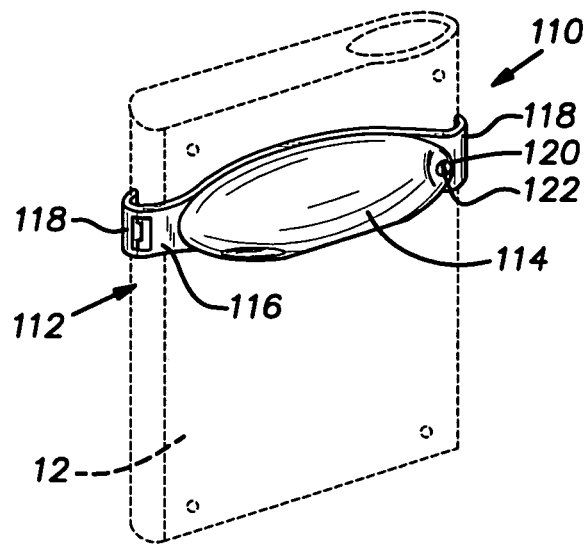
FIG. 10 is a perspective view of another embodiment of a pillbox according to the invention that includes a pivotally mounted door that defines a medication compartment.
Figure 11:
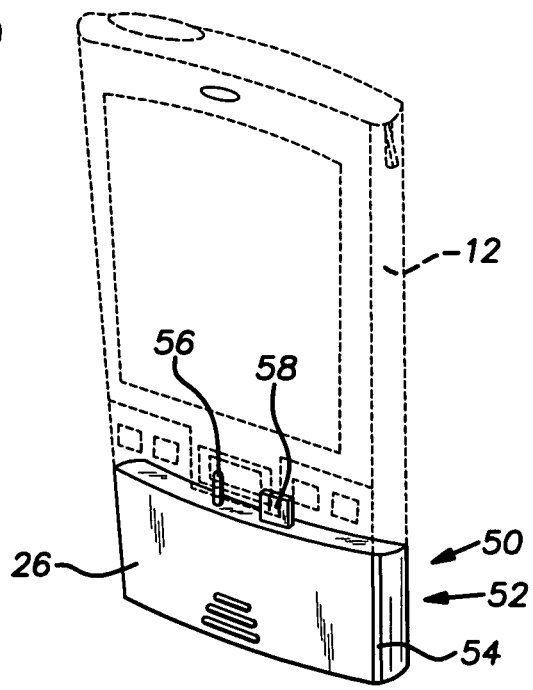
FIG. 11 is a perspective view of another embodiment of a pillbox according to the invention that can be connected to the bottom of a PED.
Figure 12:
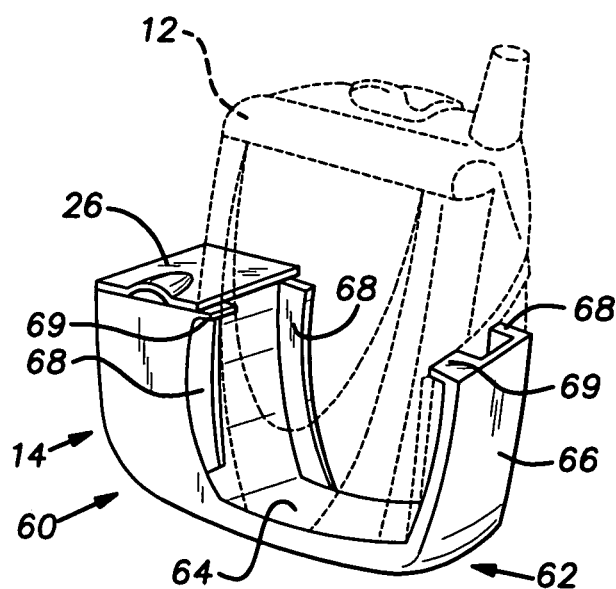
FIG. 12 is a perspective view of another embodiment of a pillbox according to the invention that is included as part of a holster into which a PED can be inserted.
Figure 14:
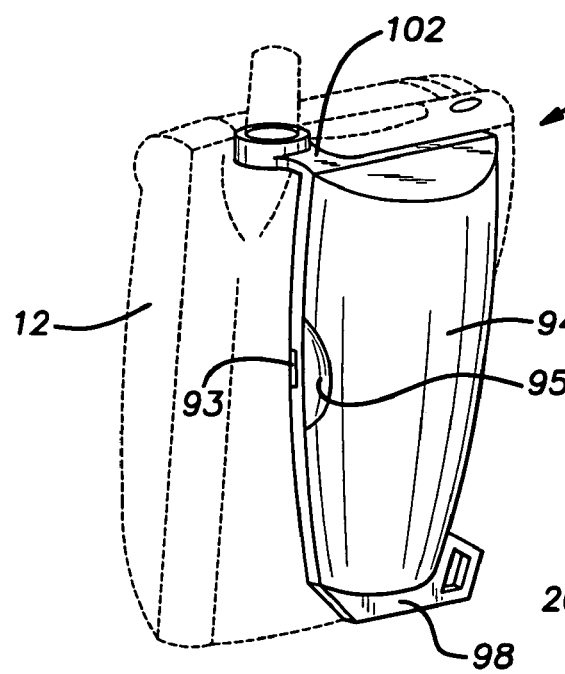
FIG. 14 is a perspective view of another embodiment of a pillbox according to the invention that is similar to the embodiment of FIG. 9.
Figure 15:
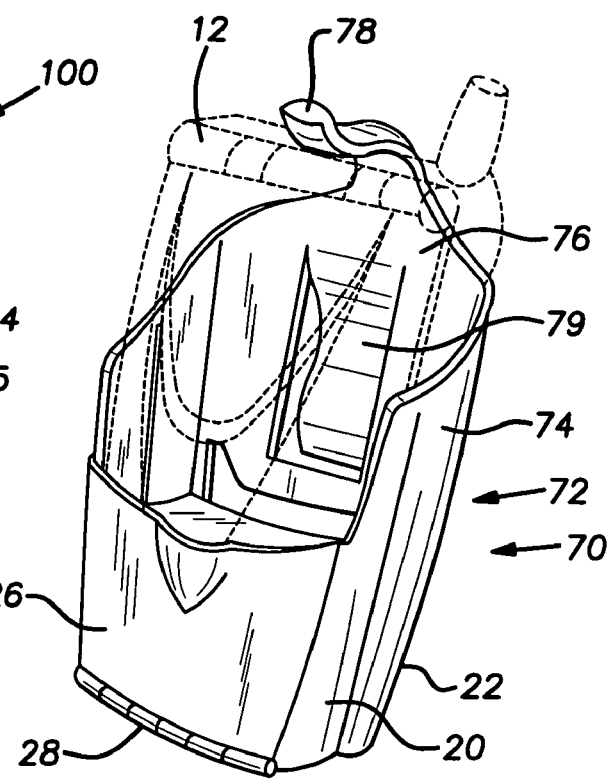
FIG. 15 is a perspective view of another embodiment of a pillbox according to the invention that is similar to the embodiment of FIG. 12.

The embodiments shown in FIGS. 11, 12, and 15 are similar to the first-described embodiment of FIGS. 1-7 because they each have a body portion that defines a compartment within which pills can be disposed, a movable door that is connected to the body portion to selectively cover and uncover the compartment, and a connection between the body portion and the PED. The embodiments shown in FIGS. 8-10, 13, and 14 are similar to each other because each has a body portion attached to a PED, a movable door that defines a compartment with one or more chambers within which pills can be disposed, and a connection between the door and the body portion. In the description that follows, like reference numerals will be used to indicate components that are similar or identical, or which perform similar or identical functions.

Turning first to FIG. 11, a pillbox is indicated by the reference numeral 50. The pillbox 50 has a body portion 52 that is similar to the body portion 14, including a top wall 16, a bottom wall 18, side walls 20, and a rear wall 22. The interior surfaces of the walls 16, 18, 20, 22 define a cavity, or compartment 24 within which medication such as pills or capsules can be placed. A door 26 is connected to the forward edges of the sidewalls 20 by tracks indicated at 54. The tracks 54 permit sliding movement of the door 26. The door 26 completely covers the front of the compartment 24 when the door 26 is in the closed position as indicated in FIG. 11. A connection between the body portion 14 and the PED 12 is provided. The connection includes spaced prongs 56, 58 that fit into the typical recharging and data ports included as part of the PED 12. In the illustrated embodiment, the body portion 14 and the extension 40 are configured to closely match the shape of the portions of the PED 12 with which they are in contact.

Referring to FIG. 12, another embodiment of the invention is indicated by the reference numeral 60. The embodiment 60 includes a body portion 14 of generally cubic shape to which an upper door 26 is attached by means of a "living hinge." A holster 62 is connected to and projects from the body portion 14. The holster 62 is of a size and shape to receive a portion of the PED 12. To that end, the holster has a bottom wall 64 against which a bottom wall of the PED 12 is in contact and an upwardly extending side wall 66 that is in contact with a sidewall of the PED 12. The sidewall 66 is opposite to the body portion 14 and contains the PED 12 therebetween. The connection between the PED 12 and the holster 62 includes flanges 68 and ledges 69 that project from the holster 62 and which engage the PED 12. The foregoing construction permits the PED 12 to be inserted into the holster 62 and retained in place there.

Referring to FIG. 15, another embodiment of the invention is indicated by the reference numeral 70. The embodiment 70 is similar to the embodiment of FIG. 12. A holster 72 is connected to and extends from the side walls 20 and the rear wall 22 of the body portion 14. The holster 72 includes sidewalls 74 that conform generally to the shape of sidewalls of the PED 12 and a rear wall 76 that conforms generally to the shape of a rear wall of the PED 12. The door 26 defines the front wall of the body portion 14. A tab 76 projects from the upper end of the rear wall 76 and engages the upper end of the PED 12. A clip 79 is formed as part of the rear wall 76. The PED 12 is held in place within the holster by the combined action of the sidewall 74, the rear wall 76 and the tab 78. The clip 79 enables the holster 72 to be conveniently carried on a user's belt.

Referring to FIG. 8, another embodiment of the invention is indicated by the reference numeral 80. The embodiment 80 includes a body portion 82 attached to the PED 12, a movable hollow door 84 that defines a compartment within which pills can be disposed, and a connection between the door 84 and the body portion 82. When the door 84 is in a closed position, it overlies a portion of the flat wall 86 and together with the flat wall 86 defines a compartment. The door 84 has opposed side portions and opposed end portions, the side portions and the end portions defining a perimeter that engages the wall 86 in surface-to-surface contact to establish a closure for the compartment. The compartment is closed when the perimeter of the door 84 is entirely in contact with the wall 86 and the compartment is open when at least a portion of the perimeter of the door 84 is not in contact with the wall 86. The body portion 82 includes a generally flat wall 86 that lies in a plane and clips 88 that project from opposing sides of the wall 86 to wrap around side wall portions of the PED 12. The door 84 has a flat surface 85 that stabilizes the PED 12 when it is placed on its back on a flat surface or which can accept an identifying label or molded indicia (not shown). The door 84 also has a pair of indents 87 to enable a user to more readily grasp the door 84.

The connection between the door 84 and the body portion 82 is defined by a pair of spaced, parallel tracks 89 that are included as part of the wall 86 of the body portion 82. The door 84 is movable back and forth along the tracks 89 in a plane parallel with the plane in which the wall 86 lies. The tracks 89 receive the side portions of the door 84. The perimeter portion of the door 84 is in contact with the wall 86 during those times that the door 84 overlies the wall 86.

The embodiment 80 includes means for keeping door 84 in a compartment-closed position. The means for keeping the door 84 in a compartment-closed position comprises flexible tabs included as part of the door 84. The tabs provide an interference fit with the ends of the tracks 89 when the door 84 is centered within the tracks 89. The tabs are movable in order to be disposed within the tracks 89 when the door 84 is moved toward a compartment-open position.

Referring to FIG. 9, another embodiment of the invention is indicated by the reference numeral 90. The embodiment 90 includes a body portion 92 attached to the PED 12, a movable door 94 that defines a compartment within which pills can be disposed, and a connection between the door 94 and the body portion 92. One side of the door 94 engages a raised ledge 93. The door 94 has a depression 95 adjacent the ledge 93. The body portion 92 includes a generally flat wall 96 that lies in a plane and clips 98 that project from opposing ends of the wall 96 to engage the top and bottom of the PED 12. As with the door 84, the door 94 has a flat surface 97 for stabilizing the PED 12 or for accepting a label or molded indicia. The connection between the door 94 and the body portion 92 is defined by a hinge (not shown) that permits pivoting movement of the door 94 out of the plane in which the wall 96 lies. The depression 95 permits the user to grasp and squeeze the door 94 so as to release the edge of the door 94 from the ledge 93.

Referring to FIG. 14, another embodiment of the invention is indicated by the reference numeral 100. The embodiment 100 shown in FIG. 14 is similar to the embodiment shown in FIG. 9, except that the upper clip 98 is in the form of a loop 102 that fits about an antenna or stylus included as part of the PED 12.

Referring to FIG. 10, another embodiment of the invention is indicated by the reference numeral 110. The embodiment 110 is similar to the embodiment of FIG. 8, and includes a body portion 112 attached to the PED 12, a movable door 114 that defines a compartment within which pills can be disposed, and a connection between the door 114 and the body portion 112. The body portion 112 includes a generally flat wall 116 that lies in a plane and clips 118 that project from opposing sides of the wall 116 to engage the sides of the PED 12. The connection between the door 114 and the body portion 112 is defined by a post 120 included as part of a selected one of the wall 116 or the door 114, and a receptacle 122 for receiving the post 120 that is included as part of the other of the wall 116 or the door 114. The door 114 is movable relative to the wall 116 by being pivoted about the pin 120 in a plane generally parallel with the plane in which the wall 116 lies. A detent (not shown) is provided to retain the door 114 in that position shown in FIG. 10 until the user desires to open the door 114.

Figure 13:
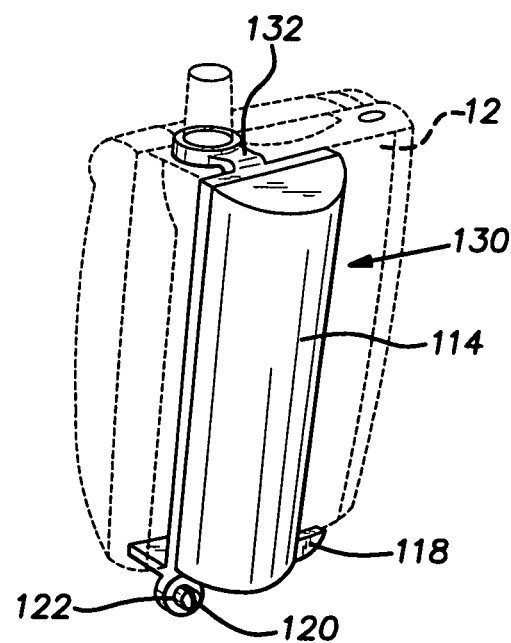
FIG. 13 is a perspective view of another embodiment of a pillbox according to the invention that is similar to the embodiment of FIG. 10, but in which the door is oriented vertically rather than horizontally.

Referring to FIG. 13, another embodiment of the invention is indicated by the reference numeral 130. The embodiment 130 shown in FIG. 13 is similar to the embodiment shown in FIG. 10, except that the upper clip 118 is in the form of a loop 132 that fits about an antenna or stylus included as part of the PED 12.

As will be apparent from the foregoing description, the pillbox 10 according to the invention is compact, readily usable, and capable of being manufactured quickly and inexpensively. The various embodiments of the invention permit the pillbox 10 to be used with a wide variety of PED configurations and provide desirable options for a user.

Although the invention has been described in its preferred form with a certain degree of particularity, it will be understood that the present disclosure of the preferred embodiment has been made only by way of example and that various changes may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. A pillbox for attachment to a PED having side wall portions, comprising:

a body portion that includes a generally flat wall that lies in a plane, the flat wall having opposed sides, the body portion being attached to the PED by clips that project from the opposing sides and that wrap around the side wall portions of the PED;

a exposed hollow door that in a closed position overlies a portion of the flat wall and together with the flat wall defines a compartment within which pills can be disposed, the door having opposed side portions and opposed end portions, the side portions and the end portions defining a perimeter that engages the flat wall in surface-to-surface contact to establish a closure for the compartment, the door being movable relative to the body portion to selectively open and close the compartment, the compartment being closed when the perimeter of the door is entirely in contact with the flat wall and the compartment being open when at least a portion of the perimeter of the door is not in contact with the flat wall; and a connection between the door and the body portion, the connection between the door and the body portion being defined by the side portions of the door and a pair of spaced, parallel tracks that are included as part of the wall of the body portion and which receive the side portions of the door, the door being movable back and forth along the tracks in a plane parallel with the plane in which the flat wall lies, the perimeter portion of the door being in contact with the flat wall during those times that the door overlies the flat wall.

2. The pillbox of claim 1, further comprising alarm software that can be included as part of the PED, the alarm software enabling the PED to provide reminders to a user to take medication at prescribed intervals or times.

3. The pillbox of claim 1, wherein the door includes a pair of indents to facilitate the door being grasped by a user.

4. The pillbox of claims 1, wherein the door is generally rounded, and includes a pair of indents to facilitate the door being grasped by a user.

5. The pillbox of claim 1, wherein the door is generally rounded, and has a flat surface that stabilizes the PED when the PED is placed on its back on a flat surface.

6. The pillbox of claim 1, further comprising means for keeping the door in a compartment-closed position.

7. The pillbox of claim 6, wherein the means for keeping the door in a compartment-closed position comprises flexible tabs included as part of the door, the tabs providing an interference fit with the ends of the tracks when the door is centered within the tracks, the tabs being movable in order to be disposed within the tracks when the door is moved toward a compartment-open position.

8. A pillbox for attachment to a PED having side wall portions, comprising:

a body portion that includes a generally flat wall that lies in a plane, the flat wall having opposed sides, the body portion being attached to the PED by clips that project from the opposing sides and that wrap around the side wall portions of the PED;

a generally rounded, exposed hollow door that in a closed position overlies a portion of the flat wall and together with the flat wall defines a compartment within which pills can be disposed, the door having opposed side portions and opposed end portions, the side portions and the end portions defining a perimeter that engages the flat wall in surface-to-surface contact to establish a closure for the compartment, the door being movable relative to the body portion to selectively open and close the compartment the compartment being closed when the perimeter of the door is in contact with the flat wall and the compartment being open when at least a portion of the perimeter of the door is not in contact with the flat wall, the door including a pair of indents to facilitate the door being grasped by a user and a flat surface that stabilizes the PED when the PED is placed on its back on a flat surface; and a connection between the door and the body portion, the connection between the door and the body portion being defined by the side portions of the door and a pair of spaced, parallel tracks that are included as part of the wall of the body portion and which receive the side portions of the door, the door being movable back and forth along the tracks in a plane parallel with the plane in which the flat wall lies, the perimeter portion of the door being in contact with the flat wall during those times that the door overlies the flat wall.

9. The pillbox of claim 8, further comprising alarm software that can be included as part of the PED, the alarm software enabling the PED to provide reminders to a user to take medication at prescribed intervals or times.

10. The pillbox of claim 8, further comprising means for keeping the door in a compartment-closed position.

11. The pillbox of claim 10, wherein the means for keeping the door in a compartment-closed position comprises flexible tabs included as part of the door, the tabs providing an interference fit with the ends of the tracks when the door is centered within the tracks, the tabs being movable in order to be disposed within the tracks when the door is moved toward a compartment-open position.

* * * * *